United States Patent
Shimoda et al.

(10) Patent No.: US 8,294,563 B2
(45) Date of Patent: Oct. 23, 2012

(54) VEHICLE-SURROUNDING IMAGE DISPLAY APPARATUS AND VEHICLE-SURROUNDING IMAGE DISPLAY METHOD

(75) Inventors: Kenichi Shimoda, Iwaki (JP); Koichi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 417 days.

(21) Appl. No.: 12/776,688

(22) Filed: May 10, 2010

(65) Prior Publication Data

US 2011/0025489 A1 Feb. 3, 2011

(30) Foreign Application Priority Data

Aug. 3, 2009 (JP) ................................. 2009-180842

(51) Int. Cl.
*B60Q 1/00* (2006.01)
*H04N 7/18* (2006.01)
*G06K 9/00* (2006.01)

(52) U.S. Cl. .................... 340/459; 340/425.5; 340/937; 348/148; 382/104

(58) Field of Classification Search .................. 340/459; 348/148
See application file for complete search history.

(56) References Cited

U.S. PATENT DOCUMENTS

| | | | |
|---|---|---|---|
| 6,593,960 B1 | 7/2003 | Sugimoto et al. | |
| 6,633,811 B1 | 10/2003 | Aumayer | |
| 6,911,997 B1 | 6/2005 | Okamoto et al. | |
| 7,034,861 B2 | 4/2006 | Okada et al. | |
| 7,068,289 B2 | 6/2006 | Satoh et al. | |
| 7,069,128 B2 | 6/2006 | Iwama | |
| 7,076,345 B2 | 7/2006 | Tanaka et al. | |
| 7,139,412 B2 * | 11/2006 | Kato et al. | 382/104 |
| 7,161,616 B1 | 1/2007 | Okamoto | |
| 7,218,758 B2 | 5/2007 | Ishii et al. | |
| 7,295,229 B2 * | 11/2007 | Kumata et al. | 348/148 |
| 7,432,799 B2 * | 10/2008 | Tsuboi | 340/435 |
| 7,502,048 B2 | 3/2009 | Okamoto et al. | |
| 7,576,767 B2 | 8/2009 | Lee et al. | |

(Continued)

FOREIGN PATENT DOCUMENTS

| | | |
|---|---|---|
| JP | 2001-114047 | 4/2001 |
| JP | 2003-204547 | 7/2003 |
| JP | 2004-56219 | 2/2004 |
| JP | 2004-213489 | 7/2004 |

OTHER PUBLICATIONS

Non-final Office Action dated Jul. 27, 2007 issued in related U.S. Appl. No. 11/263,533.

(Continued)

*Primary Examiner* — Donnie Crosland
(74) *Attorney, Agent, or Firm* — Brinks Hofer Gilson & Lione (57) ABSTRACT

A vehicle-surrounding image display apparatus and a vehicle-surrounding image display method permits a user to intuitively recognize in which direction a vehicle side image is displayed along with a vehicle top image. When a vehicle side image, such as a forward side view image, and a rearward mirror view image is displayed along with a top view image, distinction images indicative of a correspondence relation between the vehicle side image and the direction in which the vehicle side image is shot in the top view image, are superimposed on both the vehicle side image and the top view image, which enables a user to intuitively recognize in which direction the vehicle side image displayed along with the top view image is shot by looking at both the vehicle side image and the top view image showing the distinction images.

11 Claims, 9 Drawing Sheets

U.S. PATENT DOCUMENTS

| | | |
|---|---|---|
| 2001/0008992 A1 | 7/2001 | Saito et al. |
| 2002/0175999 A1* | 11/2002 | Mutobe et al. ............... 348/148 |
| 2003/0149526 A1 | 8/2003 | Zhou et al. |
| 2004/0184638 A1 | 9/2004 | Nobori et al. |
| 2004/0201754 A1 | 10/2004 | McAllister |
| 2004/0254729 A1 | 12/2004 | Browne et al. |
| 2005/0113985 A1 | 5/2005 | Greene |
| 2005/0278078 A1 | 12/2005 | Sterling |
| 2006/0212222 A1 | 9/2006 | Miyoshi et al. |

OTHER PUBLICATIONS

Non-final Office Action dated Dec. 18, 2007 issued in related U.S. Appl. No. 11/263,533.

Final Office Action dated Mar. 21, 2008 issued in related U.S. Appl. No. 11/263,533.

Non-final Office Action dated Jun. 8, 2010 issued in related U.S. Appl. No. 11/679,550.

* cited by examiner

FIG. 2
EXAMPLE OF IMAGE DISPLAYED ON DISPLAY UNIT WHEN STEERING WHEEL IS TURNED LEFT

FIG. 5

EXAMPLE OF IMAGE IN A CASE WHERE DISPLAY OF DISTINCTION IMAGE IS CANCELED WHEN DOOR OF VEHICLE IS OPEN

FIG.6
EXAMPLE OF IMAGE IN A CASE WHERE DISPLAY OF VEHICLE SIDE IMAGE AND DISTINCTION IMAGE IS CANCELED WHEN DOOR OF VEHICLE IS OPEN

VEHICLE-SURROUNDING IMAGE DISPLAY APPARATUS AND VEHICLE-SURROUNDING IMAGE DISPLAY METHOD

PRIORITY CLAIM

This application claims the benefit of Japanese Patent Application No. 2009-180842, filed on Aug. 3, 2009, and which is incorporated by reference herein in its entirety.

BACKGROUND

1. Field of the Invention

The present invention relates to a vehicle-surrounding image display apparatus and a vehicle-surrounding image display method, and more specifically to an apparatus for displaying an image of a side of a vehicle as seen forward or rearward from a side mirror along with a top view image of the vehicle as seen from a virtual viewpoint above.

2. Description of the Related Art

There has been proposed a technology of generating an image of the vehicle as seen from the virtual viewpoint above the vehicle (hereinafter referred to as a top view image) by providing a plurality of cameras in four directions of the vehicle and performing a viewpoint conversion processing on images of a periphery of the vehicle shot by the plurality of cameras, and displaying the top view image on a display unit such as a display (see, for example, Japanese Patent No. 3300334).

There has also been proposed another technology of generating an image of an area forward of the side mirror on a side of the vehicle (hereinafter referred to as a forward side view image) and an image of an area rearward of the side mirror on the side of the vehicle as reflected by the mirror (hereinafter referred to as a rearward mirror view image) by disposing left and right cameras of the vehicle at the side mirrors and performing another viewpoint conversion processing on images of the periphery of the vehicle shot by the cameras disposed to the side mirrors. In this technology, the forward side view image and the rearward mirror view image are displayed on the display unit along with the top view image.

According to the technology of generating and displaying the top view image, forward side view image, and the rearward mirror view image (hereinafter, collectively referred to as the vehicle-surrounding image), a driver checks the vehicle-surrounding image displayed on the display unit of the vehicle, thereby comprehending a positional relation between the vehicle and an obstacle in the periphery and driving so as to avoid a collision between the vehicle and the obstacle.

Since the top view image covers an area of the whole vehicle and its periphery as seen from above the vehicle, the positional relation between the vehicle and its periphery can be recognized at a glance. However, it is disadvantageously difficult to intuitively recognize in which direction the forward side view image and the rearward mirror view image (hereinafter, these two will be collectively referred to as the vehicle side image) are shot.

That is, although there are two each (forward and rearward) of the vehicle side images on the left and right sides, each image shows only a part (side portion) of the vehicle. Since the vehicle has a symmetric structure, the parts of the vehicle shown in the left and right vehicle side images are quite similar and they are difficult to be distinguished from each other. Furthermore, since the rearward mirror view image is a mirror-reversed image as reflected by the mirror, the left and right rearward mirror view images are easily mixed. Therefore, it is disadvantageously difficult to intuitively recognize in which direction the image is shot.

The present invention has been made to solve these problems, and it is an object of the present invention to make it easier to intuitively recognize in which direction the vehicle side image displayed along with the top view image is shot.

SUMMARY

To solve the problems described above, according to an aspect of the present invention, when at least one of the vehicle side images as seen forward from imaging devices on the left and right sides of the vehicle and the vehicle side images as seen rearward from the imaging devices on the left and right sides of the vehicle is displayed on the display unit along with the top view image, distinction images indicative of a correspondence relation between the vehicle side image and a direction in which the vehicle side image is shot in the top view image are superimposed on both the vehicle side image and the top view image.

According to an aspect of the present invention configured as described above, the distinction image indicative of the direction in which the vehicle side image is shot is displayed on the top view image on which the positional relation between the vehicle and its periphery can be recognized at a glance, and the distinction image indicative of the correspondence relation is also displayed on the vehicle side image corresponding to the shooting direction. In this manner, by looking at both the vehicle side image and the top view image showing the distinction images, the user can intuitively recognize in which direction the vehicle side image displayed along with the top view image is shot.

DETAILED DESCRIPTION

Figure 1:
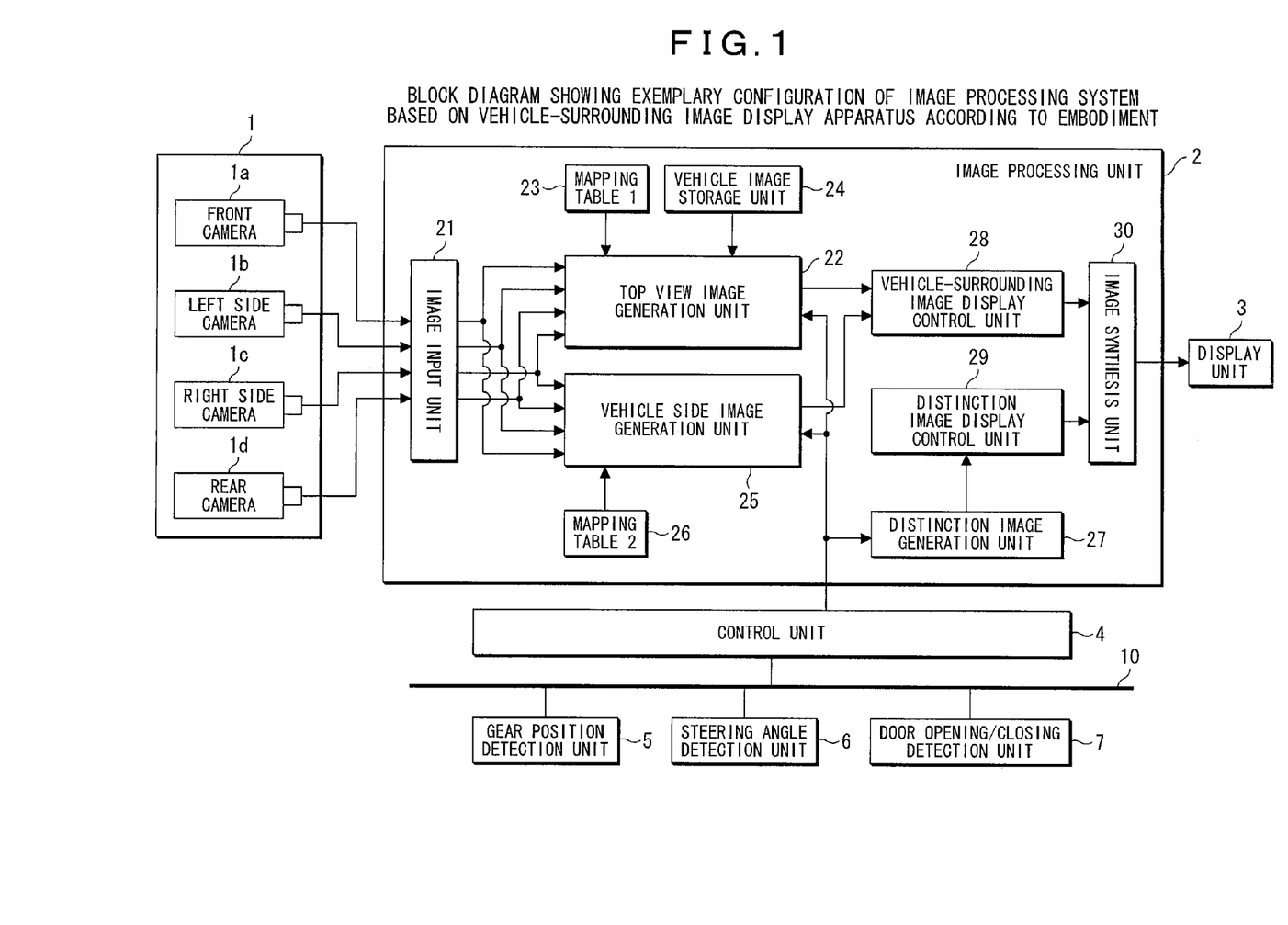
FIG. 1 is a block diagram showing an exemplary configuration of an image processing system based on a vehicle-surrounding image display apparatus according to an embodiment of the present invention.

An embodiment of the present invention will be explained below with reference to accompanying drawings. FIG. 1 is a block diagram showing an exemplary configuration of an image processing system based on a vehicle-surrounding image display apparatus according to the embodiment. As shown in FIG. 1, the image processing system according to the embodiment includes an on-vehicle camera 1, an image processing unit 2, a display unit 3, a control unit 4, a gear position detection unit 5, a steering angle detection unit 6, and a door opening/closing detection unit 7. Among these units, the image processing unit 2 corresponds to the vehicle-surrounding image display apparatus according to the present invention.

The on-vehicle camera 1 includes a plurality of imaging devices arranged in different positions at the front, rear, left, and right sides of the vehicle, which are a front camera 1a for shooting an image of the front of the vehicle, a left side camera 1b for shooting an image of the left side of the vehicle, a right side camera 1c for shooting an image of the right side of the vehicle, and a rear camera 1d for shooting an image of the rear of the vehicle. In the present embodiment, the left side camera 1b and the right side camera 1c are respectively disposed to the left and right side mirrors.

The image processing unit 2 includes, as its functional configuration, an image input unit 21, a top view image generation unit 22, a first mapping table storage unit 23, a vehicle image storage unit 24, a vehicle side image generation unit 25, a second mapping table storage unit 26, a distinction image generation unit 27, a vehicle-surrounding image display control unit 28, a distinction image display control unit 29, and an image synthesis unit 30.

The image input unit 21 inputs images of the front, rear, left, and right sides of the vehicle respectively shot by the on-vehicle cameras 1a to 1d. The top view image generation unit 22 generates a top view image of the vehicle as seen from above the vehicle by performing a viewpoint conversion processing on the images of the front, rear, left, and right sides of the vehicle input by the image input unit 21 from the on-vehicle cameras 1a to 1d.

Specifically, the top view image generation unit 22 first generates a background image showing the periphery of the vehicle as seen from above the vehicle by performing the viewpoint conversion processing according to conversion information stored in the first mapping table storage unit 23. The background image is generated by synthesizing a front vehicle-surrounding image generated by viewpoint-converting the image shot by the front camera 1a, a left side vehicle-surrounding image generated by viewpoint-converting the image shot by the left side camera 1b, a right side vehicle-surrounding image generated by viewpoint-converting the image shot by the right side camera 1c, and a rear vehicle-surrounding image generated by viewpoint-converting the image shot by the rear camera 1d.

The first mapping table storage unit 23 includes a table that stores therein a correspondence relation between pixel data of the images shot by the on-vehicle cameras 1a to 1d and pixel data of the background image showing the periphery of the vehicle as seen from a virtual viewpoint above the vehicle, and stores therein conversion information indicative of which pixel in the background image corresponds to a certain pixel in the image shot by one of the on-vehicle cameras 1a to 1d. The vehicle image storage unit 24 stores therein a vehicle image showing a shape of the vehicle as seen from above, which is read out by the top view image generation unit 22. The top view image generation unit 22 generates the top view image by synthesizing the vehicle image substantially in the center of the background image described above.

The vehicle side image generation unit 25 generates at least one of a forward side view image as seen forward from the one of the left and right side cameras 1b and 1c (left and right side mirrors) on the left and right sides of the vehicle and a rearward mirror view image as seen rearward from the one of the left and right side cameras 1b and 1c (left and right side mirrors) on the left and right sides of the vehicle through the mirror by performing the viewpoint conversion on the left and right images input from the left side camera 1b and the right side camera 1c.

Specifically, the vehicle side image generation unit 25 generates the forward side view image of an area forward of the side mirror on the left or right side of the vehicle or the rearward mirror view image of an area rearward of the side mirror on the left or right side of the vehicle as reflected by the mirror by performing the viewpoint conversion processing according to the conversion information stored in the second mapping table storage unit 26. These vehicle side images include a part of the vehicle (the image of the part of the vehicle is also subjected to the viewpoint conversion processing).

The second mapping table storage unit 26 includes a table that stores therein the correspondence relation between the pixel data of the images shot by the left and right side cameras 1b and 1c and pixel data of the vehicle side image of the periphery of the vehicle as seen forward or rearward from the side mirror, and stores therein the conversion information indicative of which pixel in the vehicle side image (forward side view image or rearward mirror view image) corresponds to a certain pixel in the image shot by the left or right side camera 1b or 1c.

Which one of the forward side view image on the left side, the forward side view image on the right side, the rearward mirror view image on the left side, and the rearward mirror view image on the right side should be generated is determined by the control unit 4 as described later.

The vehicle-surrounding image display control unit 28 performs a control so that at least one vehicle side image generated by the vehicle side image generation unit 25 is displayed on the display unit 3 along with the top view image generated by the top view image generation unit 22. Specifically, the vehicle-surrounding image display control unit 28 outputs the top view image generated by the top view image generation unit 22 and the at least one vehicle side image generated by the vehicle side image generation unit 25 to the image synthesis unit 30.

The distinction image generation unit 27 generates distinction images indicative of the correspondence relation between the vehicle side image displayed on the display unit 3 by the vehicle-surrounding image display control unit 28 and the direction in which the vehicle side image is shot in the top view image displayed on the display unit 3 by the vehicle-surrounding image display control unit 28. The distinction image display control unit 29 displays the distinction images generated by the distinction image generation unit 27 superimposed on both the vehicle side image and the top view image. Specifically, the distinction image display control unit 29 outputs the distinction images generated by the distinction image generation unit 27 to the image synthesis unit 30.

In the present embodiment, the distinction images are a headlight image to be superimposed on the headlight portion of the vehicle in the case of the area forward of the side mirror, and a brake lamp image to be superimposed on the brake lamp portion of the vehicle in the case of the area rearward of the side mirror. It is desirable to display the headlight image and the brake lamp image in different colors so that the forward area and the rearward area can be easily distinguished. For example, the headlight image may be blue, and the brake lamp image may be red.

The distinction image display control unit 29 performs a control so that the same distinction images are displayed on the part of the vehicle included in the vehicle side image (the head light portion in the case of the forward side view image and the brake lamp portion in the case of the rearward mirror view image) and a portion that is the part of the vehicle included in the top view image and that corresponds to the part of the vehicle included in the vehicle side image (the headlight portion or the brake lamp portion).

In other words, the distinction image display control unit 29 displays a blue headlight image superimposed on both the headlight portion in the left forward side view image and the left headlight portion in the top view image when the vehicle-surrounding image display control unit 28 displays the left forward side view image along with the top view image. In the same manner, the distinction image display control unit 29 displays the blue headlight image superimposed on both the headlight portion in the right forward side view image and the right headlight portion in the top view image when the vehicle-surrounding image display control unit 28 displays the right forward side view image along with the top view image.

Similarly, the distinction image display control unit 29 displays a red brake lamp image superimposed on both the brake lamp portion in the left rearward mirror view image and the left brake lamp portion in the top view image when the vehicle-surrounding image display control unit 28 displays the left rearward mirror view image along with the top view image. In the same manner, the distinction image display control unit 29 displays the red brake lamp image superimposed on both the brake lamp portion in the right rearward mirror view image and the right brake lamp portion in the top view image when the vehicle-surrounding image display control unit 28 displays the right rearward mirror view image along with the top view image.

As described above, the vehicle image is drawn at a predetermined position in the top view image, and the vehicle image is prepared by the vehicle image storage unit 24 in advance. Accordingly, positions of the headlight portion and the brake lamp portion of the vehicle in the top view image are respectively fixed and known already. Furthermore, the position of the part of the vehicle image in the vehicle side image is constantly fixed, and therefore the positions of the headlight portion and the brake lamp portion of the vehicle in the vehicle side image are also fixed and known already. The distinction image display control unit 29 performs the control so that the headlight image and the brake lamp image are superimposed on the known positions.

Figure 2:
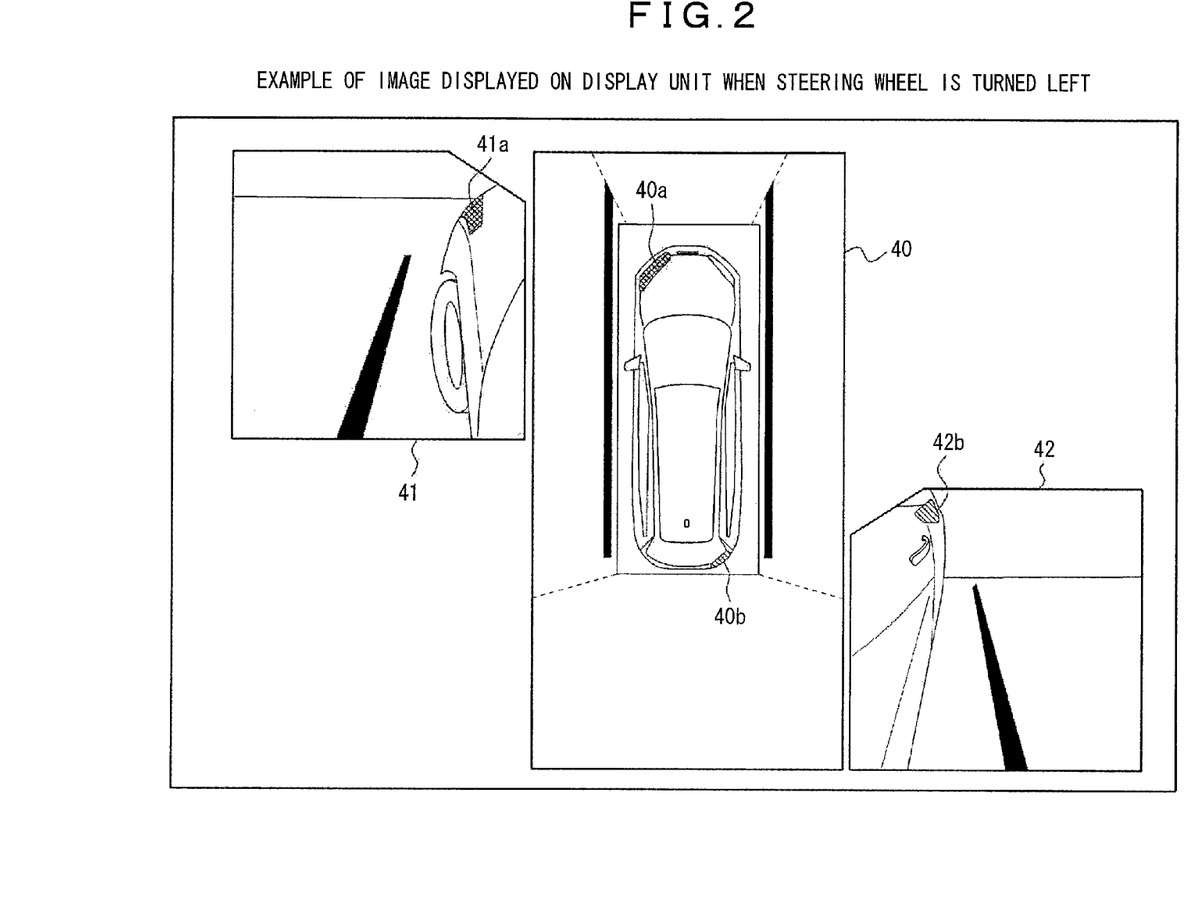
FIG. 2 shows an example of an image displayed on a display unit when a steering wheel is turned left.

FIG. 2 shows an example of the image displayed on the display unit 3 according to the present embodiment. In FIG. 2, the vehicle-surrounding image display control unit 28 displays a top view image 40 at the center of the screen, while displaying a left forward side view image 41 at the top left of the top view image 40 and a right rearward mirror view image 42 at the bottom right of the top view image 40.

The distinction image display control unit 29 also displays blue headlight images 40a and 41a respectively superimposed on both the left headlight portion in the top view image 40 and the headlight portion in the left forward side view image 41. The distinction image display control unit 29 further displays red brake lamp images 40b and 42b respectively superimposed on both the right brake lamp portion in the top view image 40 and the brake lamp portion in the right rearward mirror view image 42.

The control unit 4 controls operations of the top view image generation unit 22, the vehicle side image generation unit 25, and the distinction image generation unit 27 based on various detection results obtained by the gear position detection unit 5, the steering angle detection unit 6, and the door opening/closing detection unit 7. The gear position detection unit 5, the steering angle detection unit 6, and the door opening/closing detection unit 7 are connected to the control unit 4 via an in-vehicle local area network (LAN) 10 so as to transmit the respective detection results to the control unit 4 via the in-vehicle LAN 10.

The gear position detection unit 5 detects whether the gear position of the vehicle is reverse, and notifies the control unit 4 of the detection result. The control unit 4 controls the top view image generation unit 22, the vehicle side image generation unit 25, and the distinction image generation unit 27 to operate only when the gear position detection unit 5 detects that the gear position is reverse. This enables the top view image and the vehicle side image to be displayed on the display unit 3 superimposed with the distinction images only when the gear position is reverse.

The steering angle detection unit 6 detects the steering angle of the vehicle, and notifies the control unit 4 of the detection result. The control unit 4 determines which one of the left forward side view image, the right forward side view image, the left rearward mirror view image, and the right rearward mirror view image should be generated by the vehicle side image generation unit 25 based on the steering angle detected by the steering angle detection unit 6.

For example, when the steering wheel is turned left, the control unit 4 controls the vehicle side image generation unit 25 to generate the left forward side view image and the right rearward mirror view image. On the other hand, when the steering wheel is turned right, the control unit 4 controls the vehicle side image generation unit 25 to generate the right forward side view image and the left rearward mirror view image.

The control unit 4 also determines which one of the left and right headlight images and the left and right brake lamp images should be generated by the distinction image generation unit 27 based on the steering angle detected by the steering angle detection unit 6. For example, when the steering wheel is turned left, the control unit 4 controls the distinction image generation unit 27 to generate the left headlight image and the right brake lamp image. On the other hand, when the steering wheel is turned right, the control unit 4 controls the distinction image generation unit 27 to generate the right headlight image and the left brake lamp image.

FIG. 2 shows the example of the image to be displayed when the steering angle detection unit 6 detects that the steering wheel is turned left. On the contrary, FIG. 3 that follows FIG. 2 shows an example of the image to be displayed when the steering angle detection unit 6 detects that the steering wheel is turned right. Specifically, in FIG. 3, the vehicle-surrounding image display control unit 28 displays the top view image 40 at the center of the screen, while displaying a left rearward mirror view image 43 at the bottom left of the top view image 40 and a right forward side view image 44 at the top right of the top view image 40.

Figure 3:
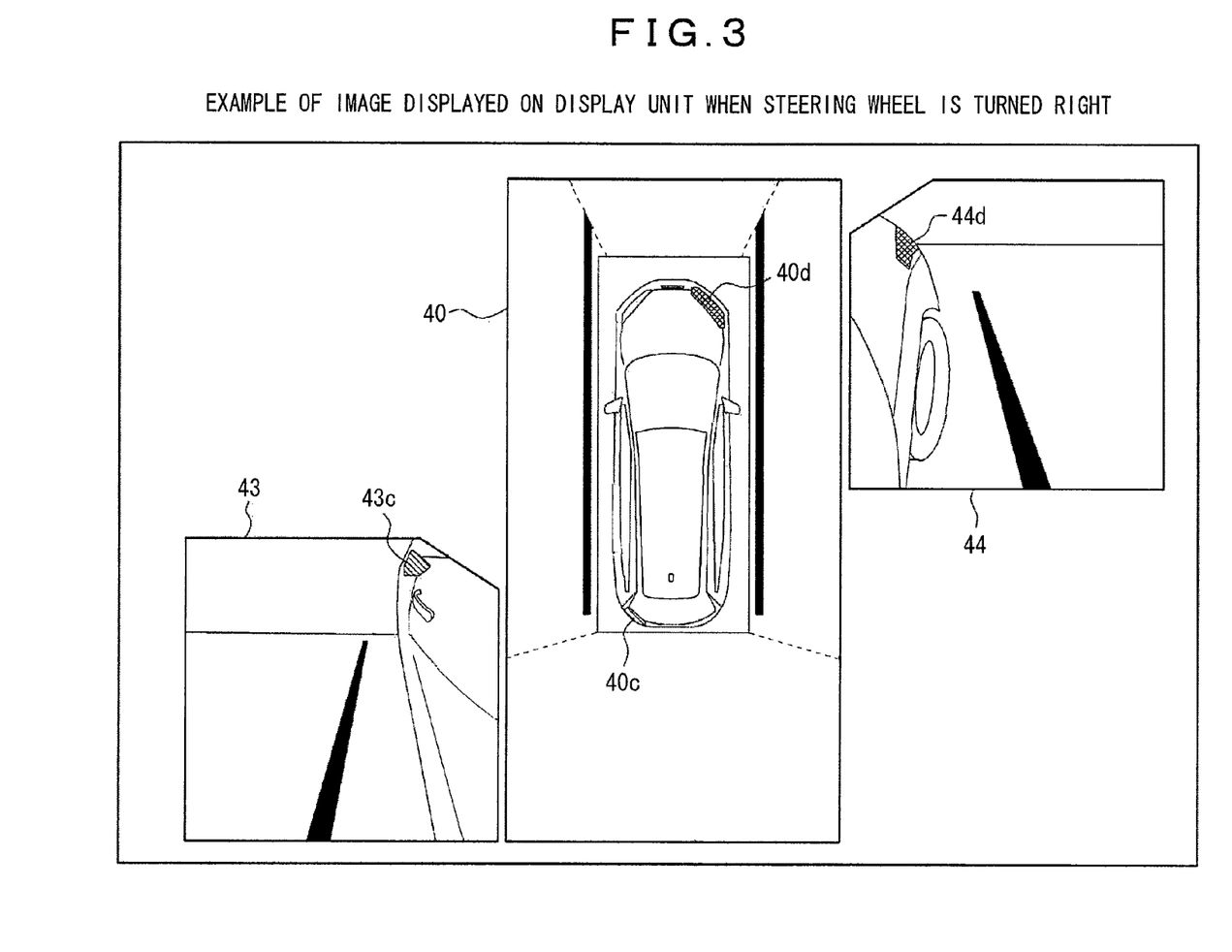
FIG. 3 shows an example of the image displayed on the display unit when the steering wheel is turned right.

The distinction image display control unit 29 also displays red brake lamp images 40c and 43c respectively superimposed on both the left brake lamp portion in the top view image 40 and the brake lamp portion in the left rearward mirror view image 43. The distinction image display control unit 29 further displays blue headlight images 40d and 44d respectively superimposed on both the right headlight portion in the top view image 40 and the headlight portion in the right forward side view image 44.

The door opening/closing detection unit 7 detects whether a front door of the vehicle (a door having the side mirror equipped with the left or right on-vehicle camera 1b or 1c) is open or close, and notifies the control unit 4 of the detection result. When the opening/closing detection unit 7 detects that the front door of the vehicle is open, the control unit 4 controls the distinction image generation unit 27 to cancel the display of the distinction images corresponding to the side on which the front door is open.

Specifically, the distinction image generation unit 27 generates the distinction images corresponding to other directions except the distinction image to be superimposed on the forward side view image on the same side as the open front door and the distinction image to be correspondingly superimposed on the top view image. The distinction image display control unit 29 displays the generated distinction images superimposed on the top view image and the vehicle side image.

Figure 4:
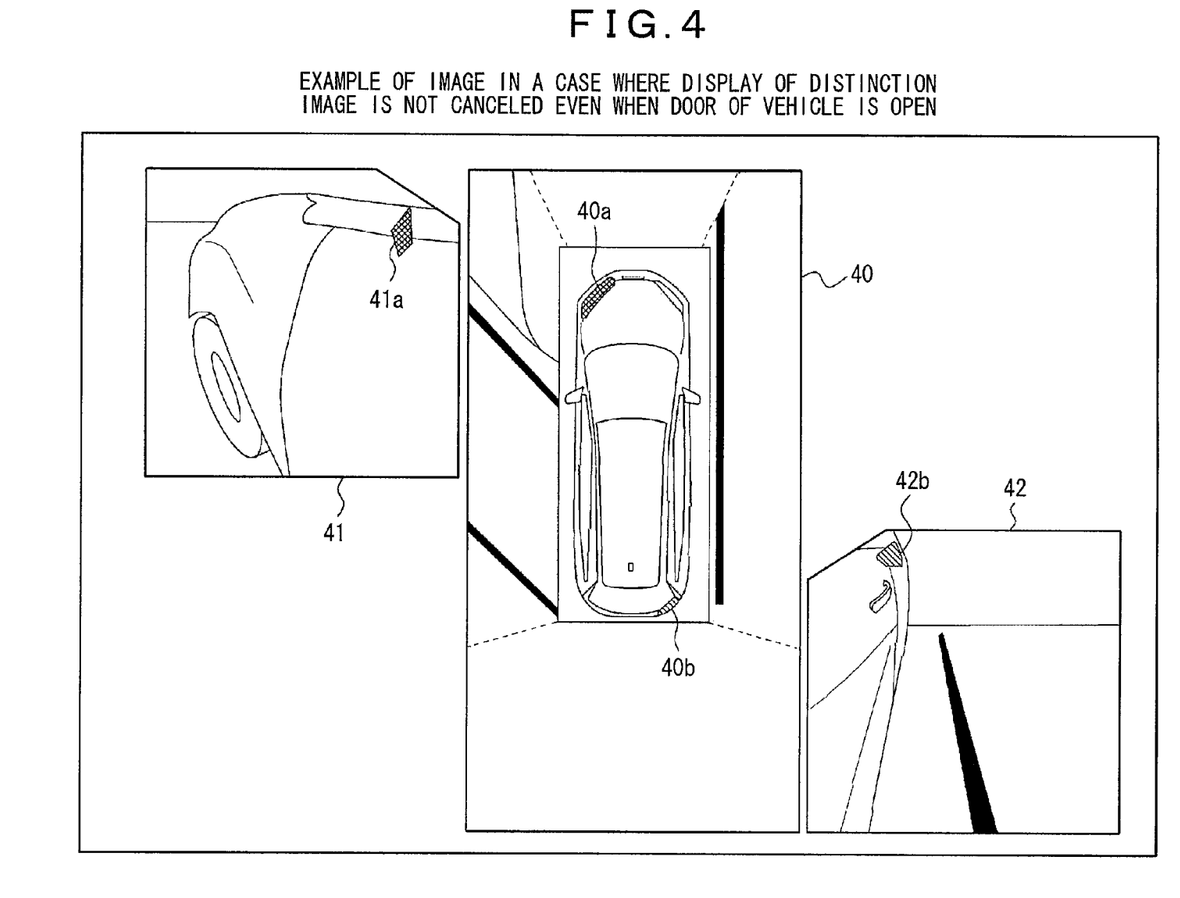
FIG. 4 shows an example of the image in a case where a display of distinction images is not canceled even when a door of a vehicle opens.

FIG. 4 shows an example of the image in a case where the display of the distinction images is not canceled even when the front door of the vehicle opens. In the example shown in FIG. 4, while the top view image 40 is displayed at the center of the screen, the left forward side view image 41 is displayed at the top left of the top view image 40 and the right rearward mirror view image 42 is displayed at the bottom right of the top view image 40. Furthermore, in the example shown in FIG. 4, the blue headlight images 40a and 41a are superimposed on both the top view image 40 and the left forward side view image 41, and the red brake lamp images 40b and 42b are also superimposed on both the top view image 40 and the right rearward mirror view image 42.

As shown in FIG. 4, the headlight image 40a on the top view image 40 is correctly superimposed on the position corresponding to the left headlight portion of the vehicle. The brake lamp image 40b on the top view image 40 and the brake lamp image 42b on the right rearward mirror view image 42 are also correctly superimposed on the respective positions corresponding to the right brake lamp portion of the vehicle. On the contrary, the headlight image 41a on the left forward side view image 41 is superimposed on an inappropriate position deviating from the left headlight portion of the vehicle. This is because the headlight image 41a is displayed on a fixed position where the left headlight portion would be located if the door is closed, though the left front door is open and the image of the vehicle shot by the left side camera 1b disposed to the side mirror has greatly changed.

Figure 5:
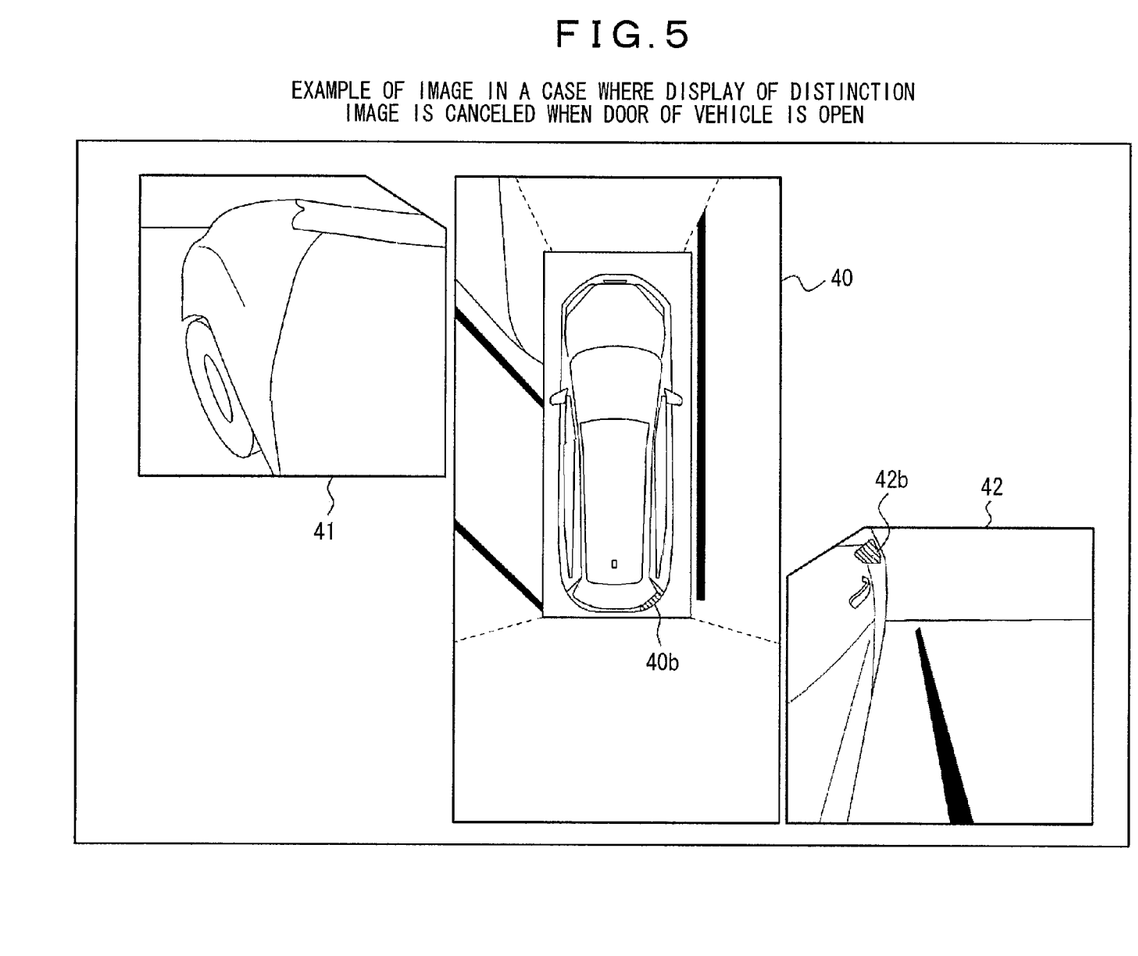
FIG. 5 shows an example of the image in a case where the display of the distinction images is canceled when the door of the vehicle is open.

FIG. 5 shows an example of the image in a case where the display of the distinction images is canceled when the left front door of the vehicle is open. In the example shown in FIG. 5, since the door opening/closing detection unit 7 detects that the left front door of the vehicle is open, the display of the headlight image is canceled on both the top view image 40 and the left forward side view image 41. In this manner, by canceling the display of the distinction images on the corresponding side when the left front door is open, such strangeness of the display as shown in FIG. 4 can be eliminated.

The control unit 4 may be configured to control the operation of the vehicle side image generation unit 25 and the distinction image generation unit 27 instead of controlling the operation of the distinction image generation unit 27 based on the detection result obtained by the door opening/closing detection unit 7. In other words, the control unit 4 may control the vehicle side image generation unit 25 to cancel the display of the vehicle side image on the side of the open door and control the distinction image generation unit 27 to cancel the display of the distinction images when the door opening/closing detection unit 7 detects that the front door of the vehicle is open.

Figure 6:
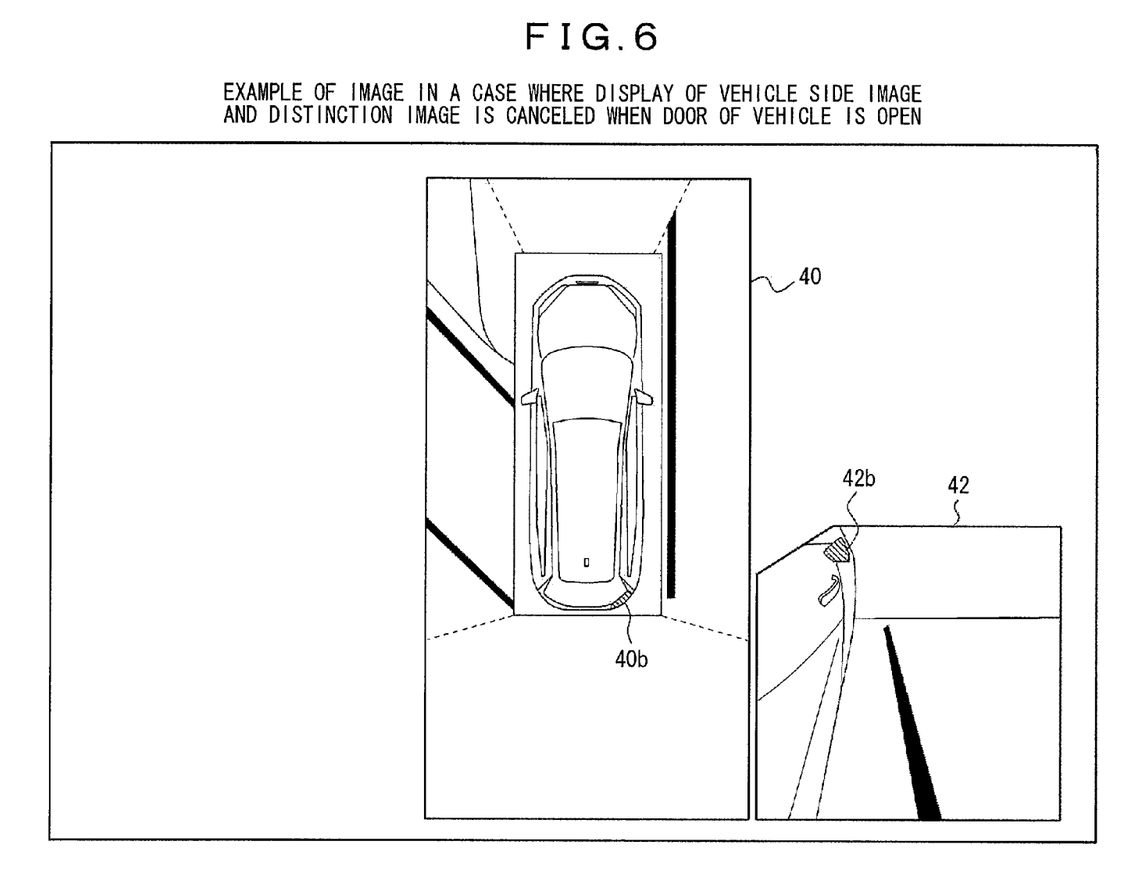
FIG. 6 shows an example of the image in a case where the display of a vehicle side image and the distinction images is canceled when the door of the vehicle is open.

FIG. 6 shows an example of the image in a case where the display of the left forward side view image and the distinction images is canceled when the left front door of the vehicle is open. It should be noted that, until the door opened, the top view image 40 and the left forward side view image 41 had been displayed and the headlight images 40a and 41a had been superimposed on the respective headlight portions of the images. In the example shown in FIG. 6, since the door opening/closing detection unit 7 detected that the left front door of the vehicle opened in such a state, the display of both the left forward side view image and the headlight image is canceled though the top view image 40 remains displayed.

Figure 7:
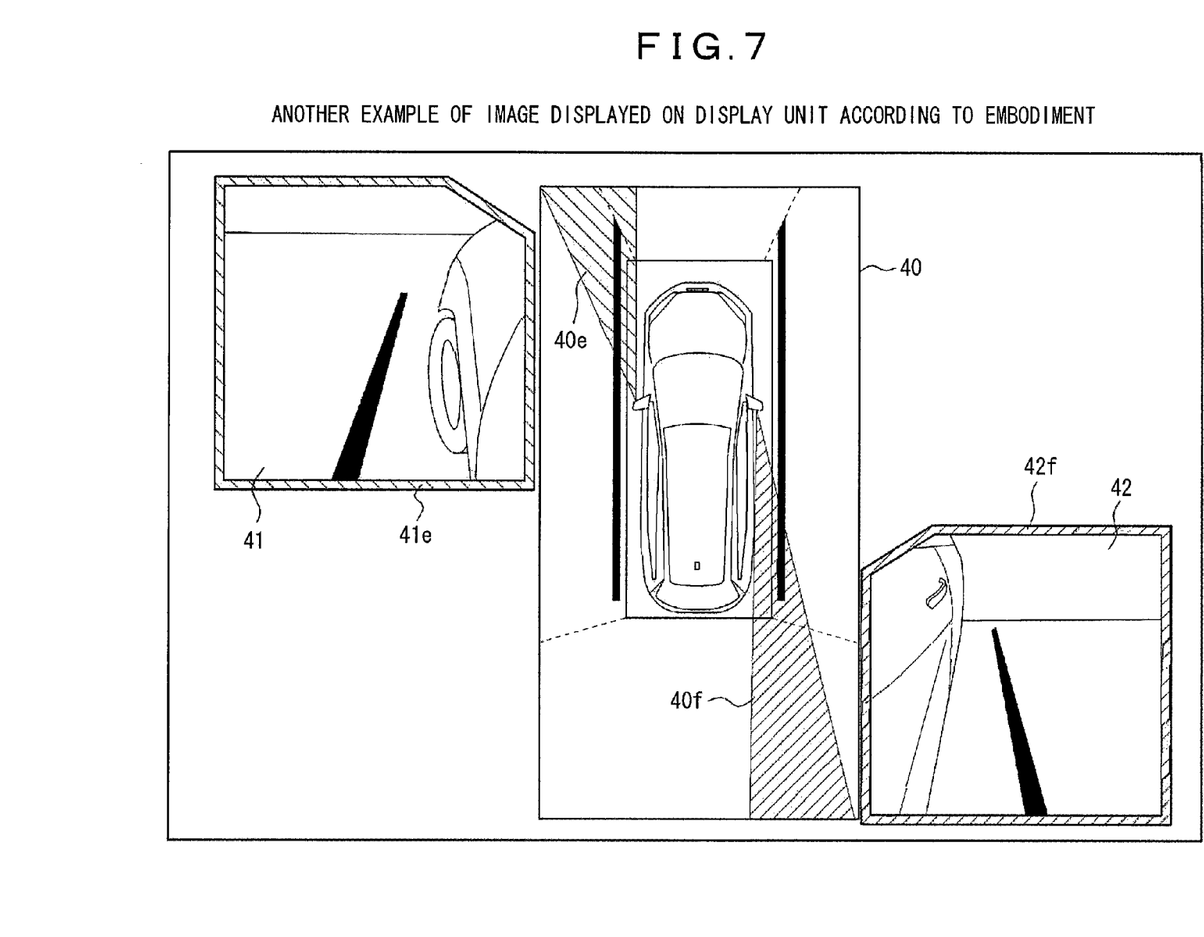
FIG. 7 shows another example of the image displayed on the display unit according to the embodiment.

Although the embodiment has been explained taking an example in which the headlight image and the brake lamp image are used as the distinction images, the present invention is not limited to this example. For example, as shown in FIG. 7, the distinction image generation unit 27 and the distinction image display control unit 29 may display window frames 41e and 42f in predetermined colors as distinction images respectively superimposed on the vehicle side images (the left forward side view image 41 and the right rearward mirror view image 42 in the case of FIG. 7). The distinction image generation unit 27 and the distinction image display control unit 29 may also display graphics 40e and 40f indicative of the directions in which the vehicle side images are shot as the distinction images, and the graphics 40e and 40f are superimposed on the top view image 40 in the same predetermined colors as the window frames 41e and 41f, respectively.

It is desirable to differentiate the predetermined color (for example, blue) of the window frame 41e on the forward side view image 41 and the graphic 40e indicative of the direction in which the forward side view image 41 is shot on the top view image 40 from the predetermined color (for example, red) of the window frame 42f on the rearward mirror view image 42 and the graphic 40f indicative of the direction in which the rearward mirror view image 42 is shot on the top view image 40 so that the front side can be easily distinguished from the rear side.

Figure 8:
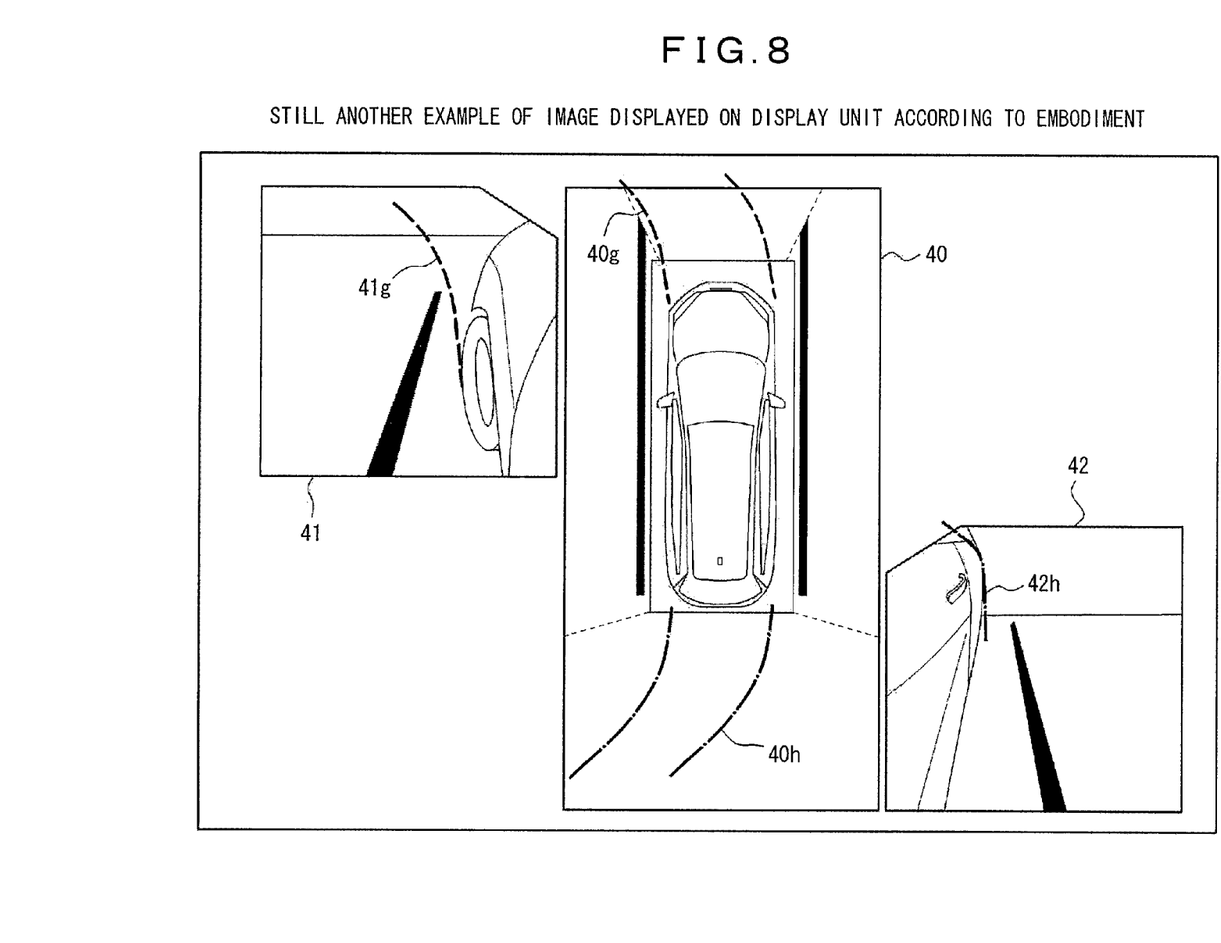
FIG. 8 shows still another example of the image displayed on the display unit according to the embodiment.

Furthermore, as shown in FIG. 8, the distinction image generation unit 27 and the distinction image display control unit 29 may generate track images indicative of predicted travel tracks of the vehicle based on the steering angle of the vehicle detected by the steering angle detection unit 6 and display the track images as the distinction images. In other words, track images 41g and 42h may be displayed in predetermined colors so as to be superimposed on the vehicle side image (the left forward side view image 41 and the right rearward mirror view image 42 in the case of FIG. 8) and track images 40g and 40h are respectively displayed in the same predetermined colors as the track images 41g and 42h on the vehicle side image so as to be superimposed on the top view image 40.

It is desirable to differentiate the predetermined color (for example, blue) of the track image 41g on the forward side view image 41 and the corresponding track image 40g on the top view image 40 from the predetermined color (for example, red) of the track image 42h on the rearward mirror view image 42 and the corresponding track image 40h on the top view image 40 so that the front side can be easily distinguished from the rear side.

Figure 9:
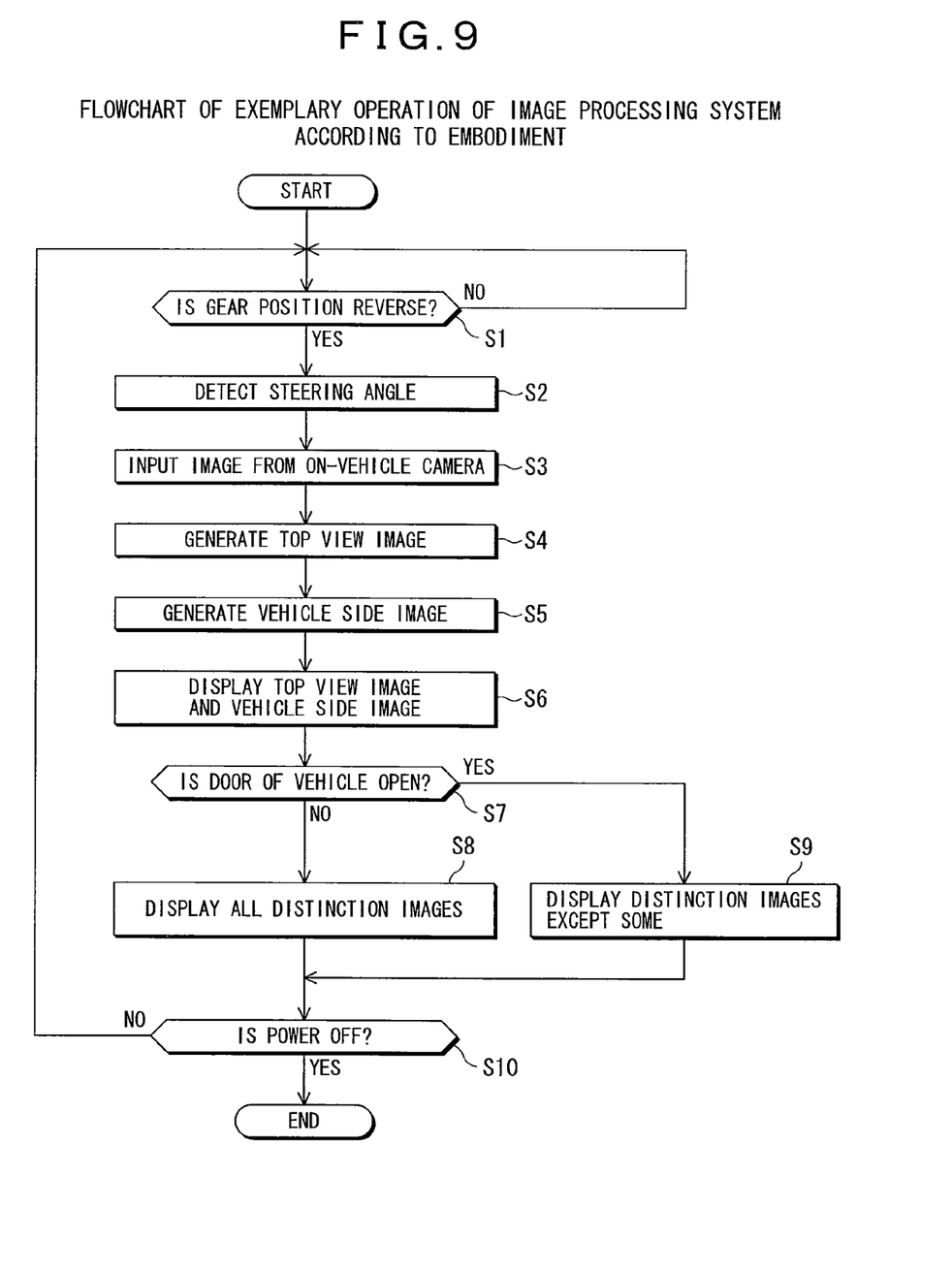
FIG. 9 is a flowchart of an exemplary operation of the image processing system based on the vehicle-surrounding image display apparatus according to the embodiment.

Given below is an explanation about an operation of the image processing system based on the vehicle-surrounding image display apparatus configured as described above according to the embodiment. FIG. 9 is a flowchart of an exemplary operation of the image processing system according to the embodiment. The flowchart shown in FIG. 9 starts when, for example, the image processing system is powered on. Although not shown in the figure since it has nothing special to do with the present embodiment, a predetermined image such as a navigation image is displayed on the display unit 3 immediately after the image processing system is powered on.

In a state where the navigation image or the like is displayed, the gear position detection unit 5 detects whether the gear position of the vehicle is reverse, and notifies the control unit 4 of the detection result. Based on the notification, the control unit 4 determines whether the gear position of the vehicle is reverse (Step S1). When it is determined that the gear position of the vehicle is not reverse, the control unit 4 continues the determination in Step S1 in the state where the navigation image or the like is displayed.

On the other hand, when the control unit 4 determines that the gear position of the vehicle is reverse, the steering angle detection unit 6 detects the steering angle of the vehicle, and notifies the control unit 4 of the detection result. Based on the notification, the control unit 4 determines whether the steering wheel is turned left or right (Step S2). Next, the image input unit 21 inputs images of the front, rear, left and right sides respectively shot by the on-vehicle cameras 1a to 1d (Step S3).

Then, according to the control by the control unit 4, the top view image generation unit 22 generates the top view image by performing the viewpoint conversion processing on the images of the front, rear, left and right sides input in Step S3 (Step S4). Furthermore, the vehicle side image generation unit 25 generates the vehicle side image (at least one of the left and right forward side view images and the left and right rearward mirror view images) in a direction determined in advance according to the direction in which the steering wheel is turned (the direction determined in Step S2) by performing the viewpoint conversion processing on the left and right images input in Step S3 (Step S5).

Next, the vehicle-surrounding image display control unit 28 controls the display unit 3 to display the top view image generated by the top view image generation unit 22 in Step S4 and the at least one vehicle side image generated by the vehicle side image generation unit 25 in Step S5 instead of the navigation image displayed earlier (Step S6).

At this time point, the door opening/closing detection unit 7 detects whether the door of the vehicle is open or close, and notifies the control unit 4 of the detection result. Based on the notification, the control unit 4 determines whether the front door on the side on which the vehicle side image is displayed is open or not (Step S7). When the control unit 4 determines that the front door is not open, the distinction image generation unit 27 generates the distinction images to be superimposed on the top view image and the vehicle side image according to the control by the control unit 4. Furthermore, the distinction image display control unit 29 displays the generated distinction images superimposed on the top view image and the vehicle side image (Step S8).

On the other hand, when the control unit 4 determines that the front door is open, the distinction image generation unit 27 generates the distinction images corresponding to other directions except the distinction image to be superimposed on the forward side view image on the side on which the front door is open and the distinction image to be correspondingly superimposed on the top view image according to the control by the control unit 4. Furthermore, the distinction image display control unit 29 displays the generated distinction images superimposed on the top view image and the vehicle side image (Step S9).

At last, the control unit 4 determines whether the image processing system is powered off (Step S10). When the power is not turned off, the process returns to Step S1. On the other hand, when the power is turned off, the process in the flowchart is terminated.

As explained above in detail, in the present embodiment, when the display unit 3 displays the vehicle side image along with the top view image, the distinction images indicative of the correspondence relation between the vehicle side image and the direction in which the vehicle side image is shot on the top view image are superimposed on both the vehicle side image and the top view image.

According to the embodiment configured as above, the distinction image indicative of the direction in which the vehicle side image is shot is displayed on the top view image by which the positional relation between the vehicle and its periphery can be recognized at a glance, and the distinction image indicative of the correspondence relation is also displayed on the corresponding vehicle side image. In this manner, by looking at both the vehicle side image and the top view image showing the distinction images, the user can intuitively recognize in which direction the vehicle side image displayed along with the top view image is shot.

Although the embodiment has been explained taking an example of canceling the display of both the distinction image to be superimposed on the forward side view image on the side on which the front door is open and the distinction image to be correspondingly superimposed on the top view image when it is detected that the front door of the vehicle is open, the present invention is not limited to this example. Alternatively, for example, the display of only the distinction image to be superimposed on the forward side view image on the side on which the front door is open may be canceled and the distinction image on the top view image may remain displayed. In this manner, by looking at the top view image showing the distinction image, the user can intuitively recognize in which direction the vehicle side image displayed along with the top view image is shot without feeling strange by the distinction image being displayed at an inappropriate position on the forward side view image on the side of the open door.

Although the embodiment has been explained taking an example of generating the distinction images using the distinction image generation unit 27, the present invention is not limited to this example. Since the distinction images to be generated are fixed, the fixed distinction images may be stored in advance like the vehicle image storage unit 24.

It should be noted that the embodiment described above is only an example of carrying out the present invention and that the technical scope of the present invention should not be limited by the embodiment. In other words, the present invention can be embodied in various ways without departing from the spirit or the major features of the present invention.

What is claimed is:

1. A vehicle-surrounding image display apparatus comprising:

an image input unit configured to input front, rear, left, and right images captured by a plurality of imaging devices disposed at a front side, a rear side, a left side, and a right side of a vehicle, respectively;

a top view image generation unit configured to generate a vehicle top image of the vehicle as seen from a perspective above the vehicle by performing viewpoint conversion processing on the front, rear, left, and right images input by the image input unit;

a vehicle side image generation unit configured to generate at least one of a vehicle side image as seen from a perspective forward of the imaging devices on the left side and the right side of the vehicle, and a vehicle side image as seen from a perspective rearward of the imaging devices on the left side and the right side of the vehicle, by performing the viewpoint conversion processing on the left and right images input by the image input unit;

a vehicle-surrounding image display control unit configured to generate the vehicle side image and the vehicle top image on a display unit and a distinction image generation unit configured to generate distinction images indicative of a correspondence relation between the vehicle side image and a direction in which the vehicle side image is captured in the vehicle top image, wherein a distinction image display control unit displays the distinction images superimposed on the vehicle side image and the vehicle top image.

2. The vehicle-surrounding image display apparatus according to claim 1, wherein, the distinction image display control unit displays same distinction images on a part of the vehicle included in the vehicle side image and a part of the vehicle included in the vehicle top image and also corresponding to the part of the vehicle included in the vehicle side image.

3. The vehicle-surrounding image display apparatus according to claim 2, wherein the part of the vehicle is a headlight if the vehicle side image is seen from a perspective forward of the imaging device on the left or right side of the vehicle, and wherein the part of the vehicle is a brake lamp if the vehicle side image is seen from a perspective rearward from the imaging device on the left or right side of the vehicle.

4. The vehicle-surrounding image display apparatus according to claim 3, wherein the distinction image display control unit generates the distinction image of the headlight and the distinction image of the brake lamp in different colors.

5. The vehicle-surrounding image display apparatus according to claim 2, wherein, when it is detected that a door of the vehicle is open, the distinction image display control unit cancels display of the distinction images corresponding to a side corresponding to the open door.

6. The vehicle-surrounding image display apparatus according to claim 2, wherein, when it is detected that a door of the vehicle is open, the vehicle-surrounding image display control unit cancels display of the vehicle side image corresponding to the open door side, and the distinction image display control unit cancels the display of the distinction images corresponding to the open door side.

7. The vehicle-surrounding image display apparatus according to claim 1, wherein the distinction image display control unit displays a window frame in a predetermined color as the distinction image superimposed on the vehicle side image displayed by the vehicle side image display control unit, and also displays a graphic indicative of the direction in which the vehicle side image is shot in the same predetermined color as the window frame as the distinction image superimposed on the top view image displayed by the vehicle-surrounding image display control unit.

8. The vehicle-surrounding image display apparatus according to claim 7, wherein, the distinction image display control unit differentiates the predetermined color of the window frame of the vehicle side image as seen from a perspective forward from the imaging device on the left or right side of the vehicle and the graphic indicative of the direction in which the vehicle side image as seen forward is shot on the top view image from the predetermined color of the window frame of the vehicle side image as seen rearward from the imaging device on the left or right side of the vehicle and the graphic indicative of the direction in which the vehicle side image as seen rearward is shot on the top view image.

9. The vehicle-surrounding image display apparatus according to claim 1, wherein:

the distinction image display control unit generates a track image indicative of a predicted travel track of the vehicle based on a steering angle of the vehicle;

displays the track image in a predetermined color as the distinction image superimposed on the vehicle side image displayed by the vehicle side image display control unit; and displays the track image in the same predetermined color as the track image on the vehicle side image as the distinction image superimposed on the top view image displayed by the vehicle-surrounding image display control unit.

10. The vehicle-surrounding image display apparatus according to claim 9, wherein the distinction image display control unit differentiates the predetermined color of the track image on the vehicle side image as seen forward from the imaging device on the left or right side of the vehicle and the track image corresponding thereto on the top view image from the predetermined color of the track image on the vehicle side image as seen rearward from the imaging device on the left or right side of the vehicle and the track image corresponding thereto on the top view image.

11. A vehicle-surrounding image display method comprising:

inputting front, rear, left, and right images capture by a plurality of imaging devices disposed at a front side, a rear side, a left side, and a right side of a vehicle;

generating a top view image of the vehicle as seen from a perspective above the vehicle by performing viewpoint conversion processing on the front, rear, left, and right images;

generating at least one of a vehicle side image as seen from a perspective forward of the imaging devices on the left side and the right side of the vehicle, and a vehicle side image as seen from a perspective rearward of the imaging devices on the left and the right side of the vehicle, by performing the viewpoint conversion processing on the left and right images;

a vehicle-surrounding image display step of generating the vehicle side image and the vehicle top image; and a distinction image generation step of generating distinction images indicative of correspondence relation between the vehicle side image and a direction in which the vehicle side image is captured in the vehicle top image; and displaying the distinction images superimposed on the vehicle side image and the vehicle top image.

* * * * *